United States Patent
Godoy et al.

(10) Patent No.: US 6,946,832 B2
(45) Date of Patent: Sep. 20, 2005

(54) SPEED AND ANGULAR POSITION SENSING ASSEMBLY

(75) Inventors: Arquimedes Godoy, Chihuahua (MX); Aida I. Parada, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 91 days.

(21) Appl. No.: 10/400,784

(22) Filed: Mar. 27, 2003

(65) Prior Publication Data

US 2004/0189283 A1 Sep. 30, 2004

(51) Int. Cl.[7] .............................. G01B 7/30; G01P 3/48
(52) U.S. Cl. .............................. 324/207.25; 324/207.2; 324/173
(58) Field of Search ........................ 324/173, 207.25, 324/207.2, 207.21, 207.22, 235, 251, 252; 338/32 R, 32 H; 327/510

(56) References Cited

U.S. PATENT DOCUMENTS

| | | | | |
|---|---|---|---|---|
| 5,754,042 | A | * | 5/1998 | Schroeder et al. ..... 324/207.25 |
| 6,100,682 | A | * | 8/2000 | Schroeder .............. 324/207.21 |
| 6,229,299 | B1 | * | 5/2001 | Strashny ..................... 324/174 |
| 6,268,721 | B1 | | 7/2001 | Schroeder et al. |
| 6,291,989 | B1 | | 9/2001 | Schroeder |
| 6,320,374 | B1 | | 11/2001 | Schroeder |
| 6,346,808 | B1 | | 2/2002 | Schroeder |
| 6,424,896 | B1 | | 7/2002 | Lin et al. |
| 6,429,647 | B1 | | 8/2002 | Nicholson |
| 6,443,020 | B1 | | 9/2002 | Lin et al. |
| 6,518,750 | B1 | | 2/2003 | Lin et al. |
| 6,519,549 | B1 | | 2/2003 | Lin et al. |
| 6,538,429 | B2 | | 3/2003 | Schroeder et al. |
| 6,566,860 | B1 | | 5/2003 | Lin et al. |
| 6,576,890 | B2 | | 6/2003 | Lin et al. |
| 6,636,036 | B1 | * | 10/2003 | Schroeder et al. ..... 324/207.21 |
| 6,639,399 | B2 | | 10/2003 | Schroeder et al. |

* cited by examiner

*Primary Examiner*—Bot Ledynh
*Assistant Examiner*—Reena Aurora
(74) *Attorney, Agent, or Firm*—Jimmy L. Funke

(57) ABSTRACT

A sensing assembly senses angular speed and position of a device that rotates about an axis of rotation. The axis of rotation is defined with respect to a frame. The sensing assembly includes an encoder target wheel that is fixedly secured to the device. The encoder target wheel rotates about the axis of rotation with the device being measured. A first Hall effect sensor is fixedly secured to the frame at a predetermined distance from the axis of rotation. The first Hall effect sensor has a first output line and transmits a first output thereover. A second Hall effect sensor is also fixedly secured to the frame at the same predetermined distance from the axis of rotation. The second Hall effect sensor is offset from the first Hall effect sensor by ninety degrees. The second Hall effect sensor has a second output line and transmits a second output thereover. A controller is electrically connected to the first and second Hall effect sensors. The controller receives the first and second outputs. Once received, the controller calculates an angular position and a speed for said encoder target wheel and the device.

17 Claims, 4 Drawing Sheets

US 6,946,832 B2

SPEED AND ANGULAR POSITION SENSING ASSEMBLY

BACKGROUND ART

1. Field of the Invention

The invention relates to sensing assemblies for devices that rotate. More particularly, the invention relates to sensing assemblies used to calculate angular speed and position for devices using a simple sensor configuration.

2. Description of the Related Art

It is oftentimes a requirement of mechanisms having many moving parts to have knowledge of the positions of the moving parts. This requirement leads to the incorporation of sensing assemblies into many mechanisms to create signals allowing a control unit to coordinate the movement of various parts of the mechanism, thus producing the desired affect with the mechanism.

Mechanisms that include elements that rotate also require knowledge of the speed and position of the rotating parts to properly facilitate the coordinated effort of these mechanisms. Current detection systems use an encoder device to facilitate the sensing of the rotating element. The geometries of these encoder devices are typically complex, requiring complex manufacturing methods and limited multi-purpose systems. This increases inventory costs.

In addition to the differing geometries for the various encoder devices, the materials used to fabricate the encoder devices also varies. Manufacturing processes for these varying geometries and materials induce challenges to meet tolerance requirements. Compromising between the cost of producing a quality sensor and producing a sensor of suitable costs for most applications can prove to be a challenge.

Therefore, there is a need for a simple sensor assembly for measuring angular speed and position of rotating parts that is simple to manufacture. The simplicity in manufacturing translates into lower costs and better reliability.

SUMMARY OF THE INVENTION

A sensing assembly senses angular speed and position of a device that rotates about an axis of rotation. The axis of rotation is defined with respect to a frame. The sensing assembly includes an encoder target wheel that is fixedly secured to the device. The encoder target wheel rotates about the axis of rotation with the device being measured. A first Hall effect sensor is fixedly secured to the frame at a predetermined distance from the axis of rotation. The first Hall effect sensor has a first output. A second Hall effect sensor is also fixedly secured to the frame at the same predetermined distance from the axis of rotation. The second Hall effect sensor is offset from the first Hall effect sensor by ninety degrees. The second Hall effect sensor has a second output. A controller is electrically connected to the first and second Hall effect sensors. The controller receives the first and second outputs. Once received, the controller calculates an angular position and a speed for said encoder target wheel and the device.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
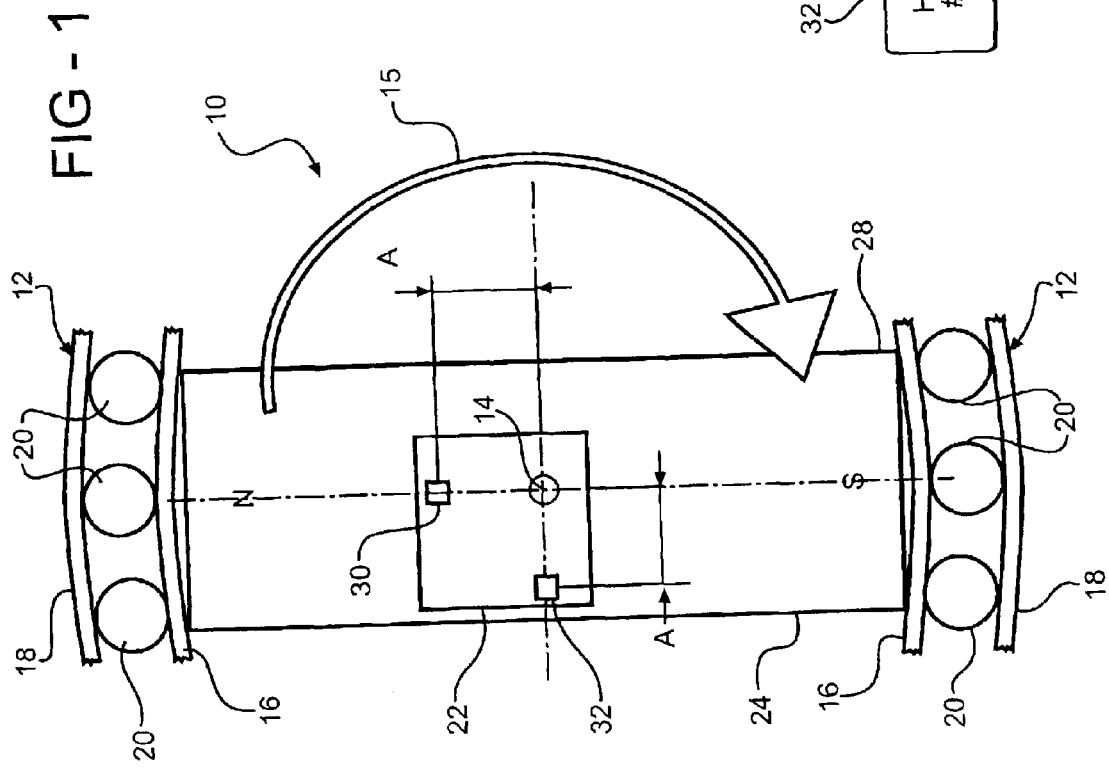
FIG. 1 is a schematic drawing of the encoder target wheel and the two Hall effect sensors incorporated into one embodiment of the invention.

Referring to FIG. 1, a sensing assembly is generally indicated at 10. The sensing assembly is designed to sense speed and angular position of a device 12 that rotates about an axis of rotation 14. In FIG. 1, the device is a bearing having an inner race 16 and an outer race 18 and ball bearings 20 extending therebetween. It should be appreciated by those skilled in the art that the device 12 may be any type of device that rotates about a single axis of rotation 14.

The device 12 rotates about the axis of rotation 14 with respect to a frame 22 in a direction represented by arrow 15. The frame 22 may be any structure that does not rotate along with the device 12. In FIG. 1, the frame 22 is a plate that is disposed adjacent the device 12. The frame 22 is connected to another structure allowing it to remain in a fixed position and not rotating about the axis of rotation 14 along with the device 12.

The sensing assembly 10 includes an encoder target wheel 24. In the embodiment, the encoder target wheel 24 is a bar magnet having a north pole 26 and a south pole 28. The magnet 24 extends through the axis of rotation 14 and rotates with the device 12. While it is shown that the magnet 24 extends all the way through the device 12, it should be appreciated that the magnet 24 need only rotate through the axis of rotation 14 along with the device 12 wherein the magnet 24 is centered about the axis of rotation 14. More specifically, the magnet 24 is secured to the device 12 and rotates about its axis of rotation therewith.

Returning attention to the frame 22, a first sensor 30 and a second sensor 32 are fixedly secured thereto. The first sensor 30 is fixedly secured to the frame 22 at a predetermined distance A from the axis of rotation 14. For purposes of simplicity in the drawings, the first sensor 30 is spaced from the axis of rotation a predetermined distance A along a horizontal axis. As may be seen in FIG. 2, the first sensor 30 has a first output line 34.

The second sensor 32 is also fixedly secured to the frame 22 at a predetermined distance A from the axis of rotation 14. In addition, the second sensor 32 is offset and angularly displaced from the first sensor 30 by 90 degrees. More specifically, the angle created between the first sensor 30, the axis of rotation 14, and the second sensor 32 is 90 degrees. For purposes of simplicity in the drawings, the second sensor 32 is offset from the axis of rotation 14 the predetermined distance A along a vertical axis. It should be appreciated by those skilled in the art that the horizontal and vertical axes are used only for purposes of illustration and the first 30 and second 32 sensors can be separated from the axis of rotation 14 in any direction so long as they are separated by ninety degrees.

The first 30 and second 32 sensors are contemplated to be magnetoresistive sensors. These sensors 30, 32 have a resistive characteristic that changes as a function of a changing presence, magnitude and direction of a magnetic field. In the preferred embodiment, the first 30 and second 32 sensors are Hall effect sensors.

In addition, both the first 30 and second 32 Hall effect sensors are displaced from the axis of rotation 14 the same predetermined distance A. As will be discussed in greater detail below, the predetermined distance A is varied, depending on the application, to change the outputs of the first 30 and second 32 Hall effect sensors. It should be appreciated that the changes made to the predetermined distance A are the same for both the first 30 and second 32 Hall effect sensors. Again referring to FIG. 2, the second Hall effect sensor 30 has a second output line 36.

Figure 2:
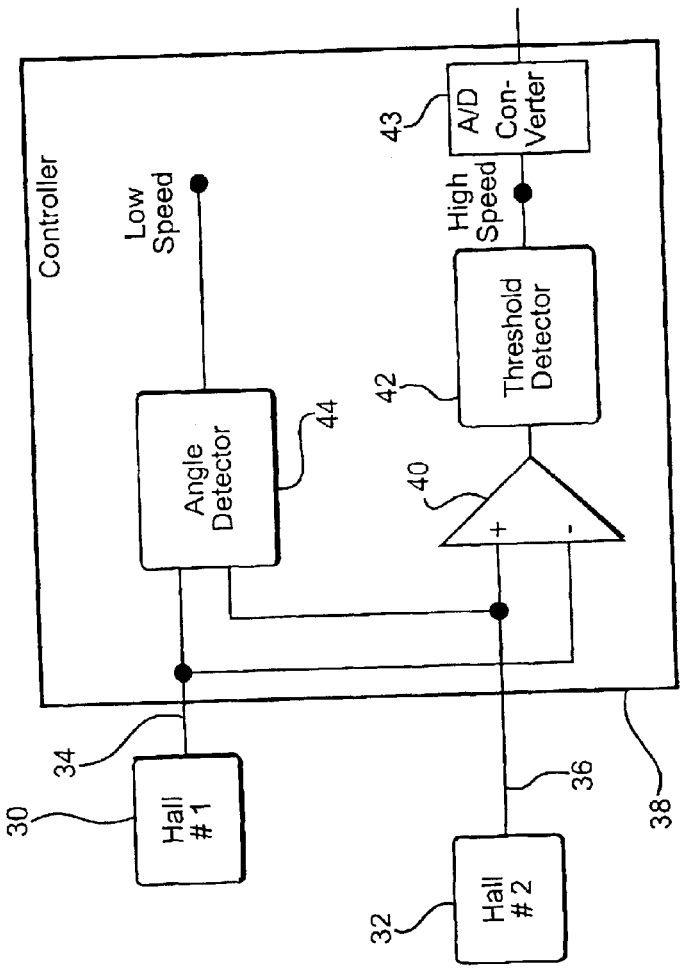
FIG. 2 is a block diagram of a circuit of the invention.

Continuing with reference to FIG. 2, the output lines 34, 36 of the first 30 and second 32 Hall effect sensors are received by a controller 38. The controller 38 receives the output lines 34, 36 to calculate the speed and angular position of the device 12 (FIG. 1). The controller 38 includes a comparator 40 that compares the first output line 34 with the second output line 36. The difference between the two output lines 34, 36 is sent to the threshold detector 42, which is used to measure the difference between the output lines 34, 36 against a threshold. Should the differential be greater than the threshold, the signal is sent to an analog-to-digital converter 43 to convert the analog signal to a digital signal. This signal is then sent to another microprocessor (not shown) where it is read to determine angular speed and position of the device 12.

The controller 38 also includes an angle detector 44 that receives both of the output lines 34, 36. The angle detector 44 is used when the threshold detector 42 has an output that represents the difference between the two output lines 34, 36 does not exceed the threshold stored therewithin. This indicates the angle detector 44 is to be used because the device 12 is not rotating at a speed sufficient to use the comparator 40 and threshold detector 42 branch of the controller 38. The elements of the controller 38 will be discussed in greater detail subsequently.

Figure 3:
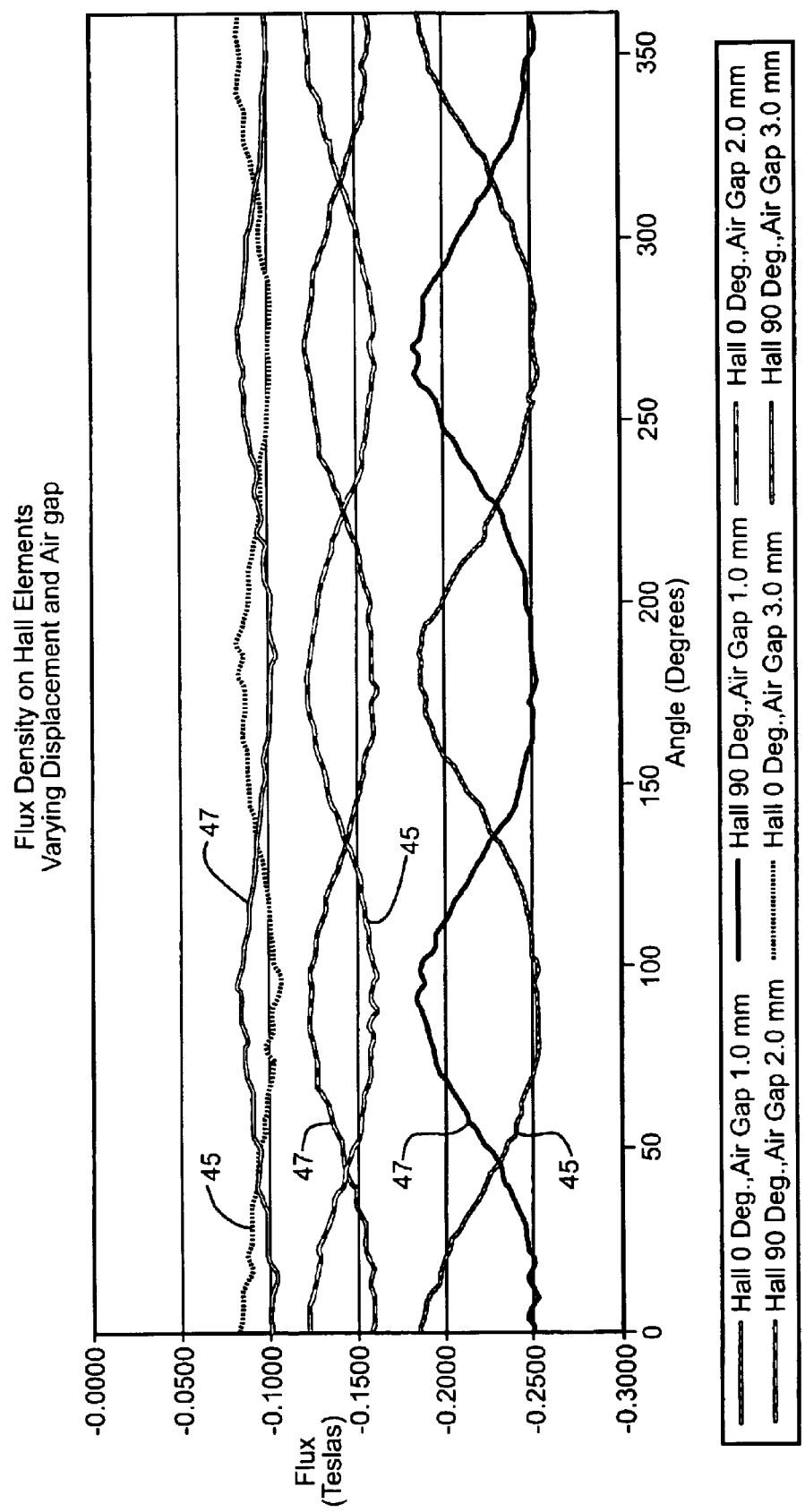
FIG. 3 is a graph of the outputs of various combinations of Hall effect sensor pairs.
Figure 4:
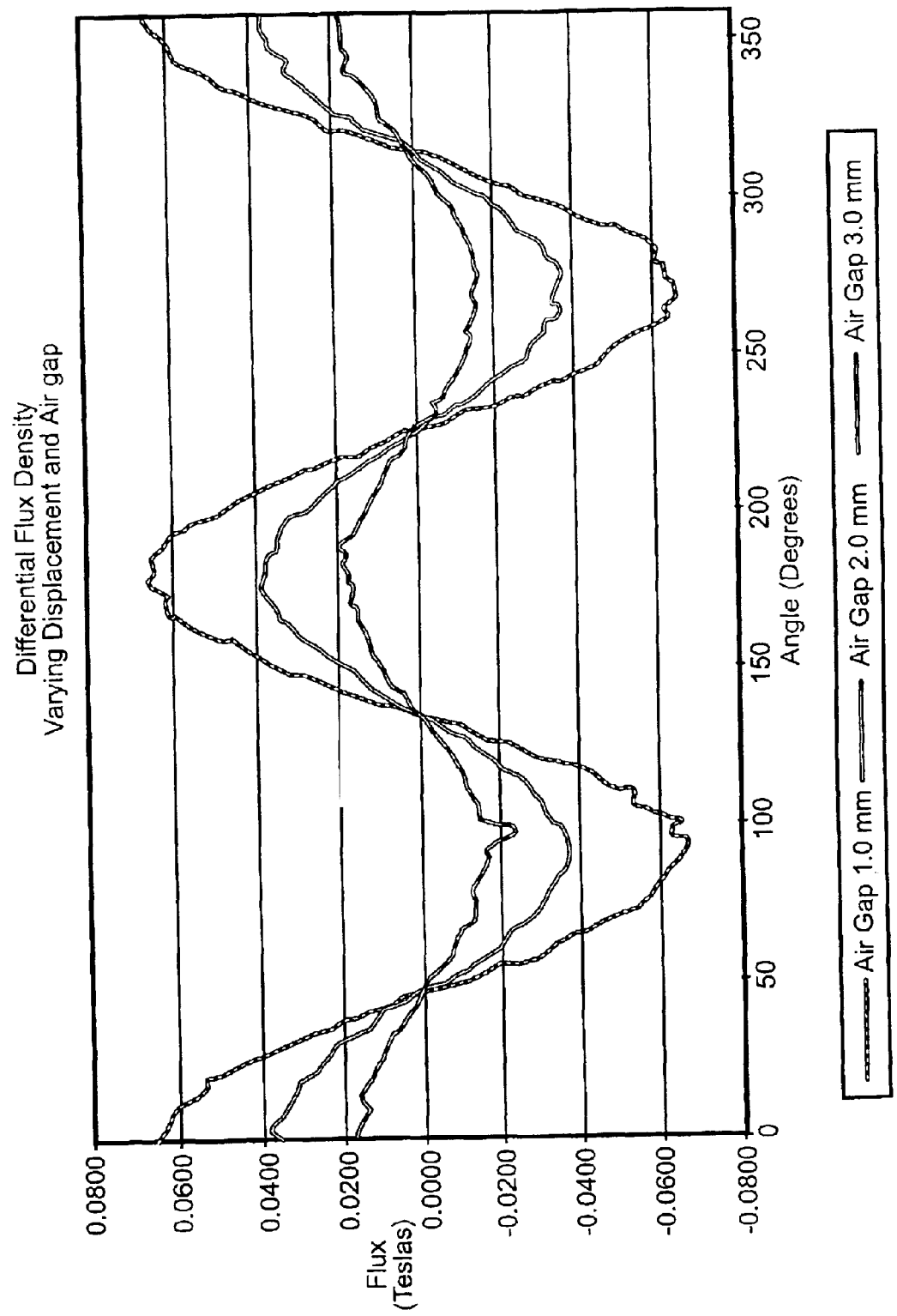
FIG. 4 is a graph of the differential flux density comparison of various combinations of Hall effect sensor pairs.

Referring to FIG. 3, outputs 45, 47 of the first 30 and second 32 Hall effect sensors are shown wherein the predetermined distance A and the air gap between the Hall effect sensors 30, 32 and the magnet 24 are varied. Each change in variables is represented by the various primed representations of the outputs 45, 47. As may be appreciated, the smaller the air gap, the stronger the outputs 45, 47 are. Referring to FIG. 4, the outputs 45, 47 are combined to identify the differential flux density as a function of air gap 49. Again, the smaller the air gap is translates into the stronger the signal from the outputs 45, 47.

Figure 5:
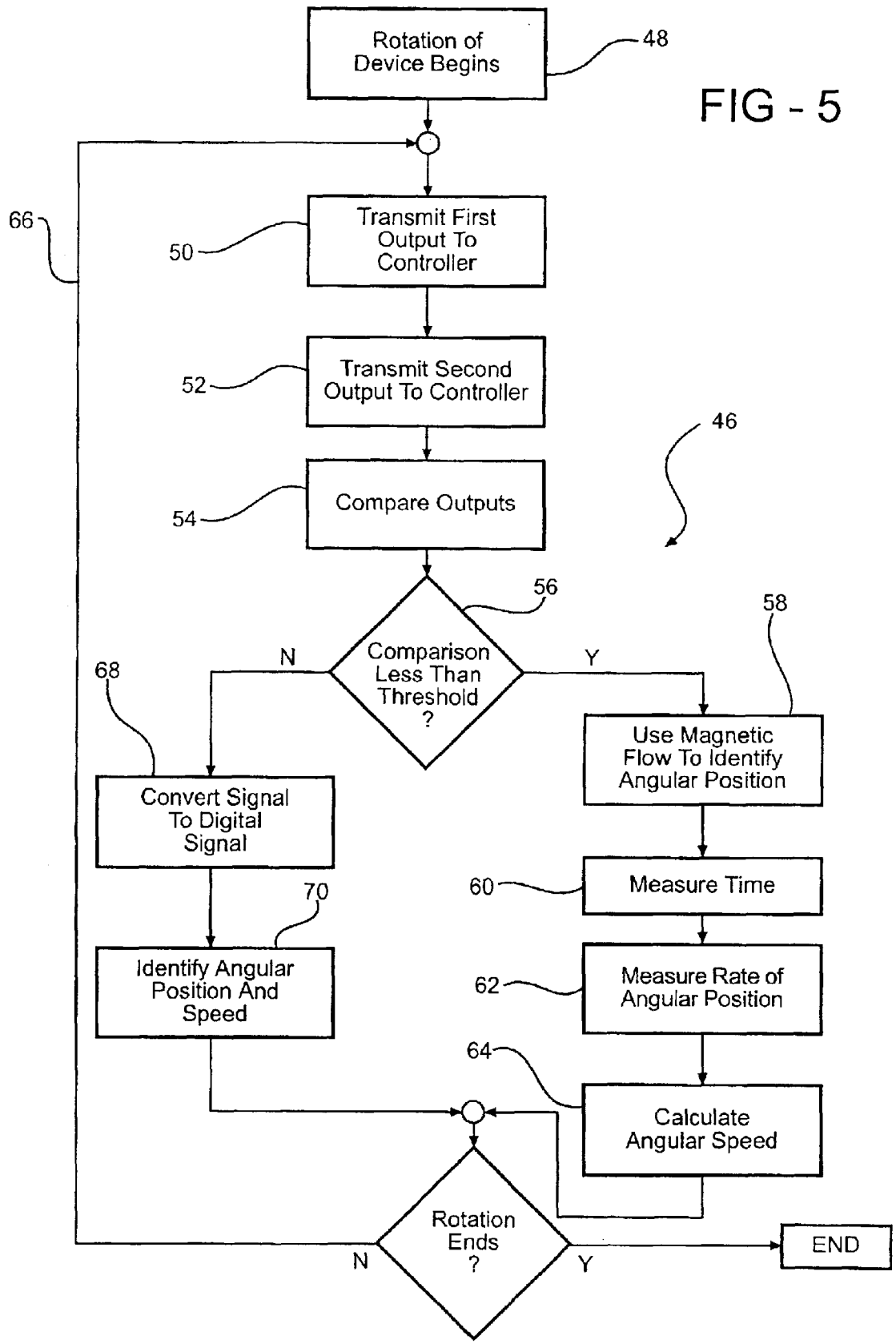
FIG. 5 is a logic chart of a method of operating the invention.

Referring to FIG. 5, a logic chart showing the method of utilizing the sensing assembly 10 is generally indicated at 46. The method begins at 48 with the rotation of the device 12. The first output 45 is transmitted to the controller at 50. The second output 47 is transmitted to the controller 38 at 52. These outputs 45, 47 are compared at 54. It is then tested to determine whether the comparison of the outputs is less than a threshold or predetermined value. This is performed at 56. If the comparison is less than the threshold, the magnetic flow is used to identify the angular position at 58. Once the angular position is identified, the time lapsed is measured at 60. The rate of angular position change is measured at 62 and the angular speed is calculated at 64. It is then determined whether the rotation of the device 12 has ended. If so, the method 46 ends. If not, the method 46 returns through a loop 66 to continue to receive the outputs 45, 47.

If, at 56, the comparison is greater than the threshold, the signal of the comparison is converted to a digital signal at 68. Once converted, the angular position and speed are identified at 70. Identification is done through a process of analysis of the digital signal. The speed with which the digital signal cycles through highs and lows is used to calculate the speed and the relative position indicated by the outputs 45, 47 in their respective quadrature relationship identifies where in the rotation the device 12 is. Another aspect of the digital signal that is used to determine angular speed and position is the rate of change in which the digital signal is changing. By knowing the rate of change, and the direction of change, direction and speed may be calculated.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A sensing assembly for sensing speed and angular position of a device rotatable about an axis of rotation with respect to a frame, said sensing assembly comprising:

an encoder target wheel fixedly secured to the device such that said encoder target wheel rotates about the axis of rotation;

a first sensor fixedly secured to the frame at a predetermined distance from the axis of rotation, said first sensor having a first output line and transmitting a first output thereover;

a second sensor fixedly secured to the frame at said predetermined distance from the axis of rotation offset and angularly displaced from said first sensor by ninety degrees, said second sensor having a second output line and transmitting a second output thereover; and a controller electrically connected to said first and second sensors to receive said first and second outputs and to calculate an angular position and a speed for said encoder target wheel and the device, wherein said controller includes a comparator for generating a differential signal by comparing said first and second outputs and measuring a difference of said first and second outputs against a threshold.

2. A sensing assembly as set forth in claim 1 wherein said controller includes a threshold detector electrically connected to said comparator, said threshold detector measuring said differential signal against a threshold.

3. A sensing assembly as set forth in claim 2 wherein said controller includes an analog to digital converter to convert said differential signal into a digital signal when said differential signal exceeds said threshold.

4. A sensing assembly as set forth in claim 3 wherein said controller includes an angle detector for measuring the angular displacement of said encoder target wheel.

5. A sensing assembly as set forth in claim 4 wherein said first sensor is a Hall effect sensor.

6. A sensing assembly as set forth in claim 5 wherein said second sensor is a Hall effect sensor.

7. A sensing assembly for sensing speed and angular position of a device rotatable about an axis of rotation with respect to a frame, said sensing assembly comprising:

an encoder target wheel fixedly secured to the device such that said encoder target wheel rotates about the axis of rotation;

a first sensor fixedly secured to the frame at a predetermined distance from the axis of rotation, said first sensor having a first output line and transmitting a first output thereover;

a second sensor fixedly secured to the frame at said predetermined distance from the axis of rotation offset from said first sensor by ninety degrees, said second sensor having a second output line and transmitting a second output thereover; and a controller electrically connected to said first and second sensors to receive said first and second outputs and to calculate an angular position and a speed for said encoder target wheel and the device, said controller including a threshold detector to measure a difference of said first and second outputs against a threshold and an angle detector for measuring the angle of rotation of said encoder target wheel by measuring the difference of the angles of rotation for each of said first and second sensors.

8. A sensing assembly as set forth in claim 7 wherein said controller includes a comparator for generating a differential signal by comparing said first and second outputs.

9. A sensing assembly as set forth in claim 8 wherein said controller includes a threshold detector electrically connected to said comparator, said threshold detector measuring said differential signal against a threshold.

10. A sensing assembly as set forth in claim 9 wherein said controller includes an analog to digital converter to convert said differential signal into a digital signal when said differential signal exceeds said threshold.

11. A sensing assembly as set forth in claim 10 wherein said first sensor includes a Hall effect sensor.

12. A sensing assembly as set forth in claim 11 wherein said second sensor includes a Hall effect sensor.

13. A method for measuring the angular displacement and velocity of a device using an encoder target wheel, first and second magnetoresistive sensors, and a controller, the method comprising the steps of:

transmitting a first output of the first magnetoresistive sensor to the controller;

transmitting a second output of the second magnetoresistive sensor to the controller;

comparing the outputs of the first and second magnetoresistive sensors; and calculating the angular speed of the device, and comparing a difference of said first and second outputs with a threshold.

14. A method as set forth in claim 13 including the step of converting the difference to a digital signal when the difference is greater than the threshold.

15. A method as set forth in claim 14 including the step of measuring time when the difference is below the threshold.

16. A method as set forth in claim 15 including the step of measuring a rate of angular position when the difference is below the threshold.

17. A method as set forth in claim 16 including the step of calculating angular speed using the rate of angular position and the time measurements.

\* \* \* \* \*